INVENTOR
ALBERT L. GAINES
BY Lawrence P. Kessler
ATTORNEY

United States Patent Office
3,686,071
Patented Aug. 22, 1972

3,686,071
BIMETALLIC SPACER GRID
Albert L. Gaines, Simsbury, Conn., assignor to Combustion Engineering, Inc., Windsor, Conn.
Filed Aug. 19, 1969, Ser. No. 851,227
Int. Cl. G21c 3/34
U.S. Cl. 176—78                                                          7 Claims

ABSTRACT OF THE DISCLOSURE

A bimetallic spacer grid for fuel element support in nuclear reactors. A plurality of spacer elements formed from a first material having characteristic low neutron capture cross section are mated with spring ferrules formed of a second material having better stress relaxation properties than the first material so as not to suffer substantial decrease in resiliency due to prolonged exposure to intensive radiation. The spring ferrules are interconnected in a separate matrix so as to always be retained within the spacer grid arrangement.

BACKGROUND OF THE INVENTION

Proper and efficient supporting of fuel elements within nuclear reactors has long been a subject upon which there has been much study and experimentation. The problem is complicated by the varied considerations which must be taken into account when designing the fuel element support structure. The supporting structure arrangement must permit relatively uninhibited flow of the reactor coolant over the fuel elements in order to prevent overheating and possible rupture of the fuel element claddings. Moreover, the material from which the supporting structure is fabricated must be of a characteristic low neutron capture cross section in order not to adversely affect over-all reactor efficiency; at the same time the material must be of such a strength so as to provide sufficient support of the fuel elements to prevent damaging vibrations from developing therein. Additionally, the spacer grid arrangement must be capable of permitting easy loading of the fuel elements without the possibility of their jamming or binding.

A grid spacer arrangement incorporating all of the desired design features discussed above is found in the copending U.S. application No. 748,149 of Donald M. Krawiec entitled "Spacer Grid." In this novel spacer grid arrangement, a plurality of spacer elements formed from a first material having a characteristic low neutron capture cross section are mated with spring ferrules formed of a second material having better stress relaxation properties than the first mentioned material (but a relatively less favorable neutron capture cross section) so as not to suffer substantial decrease in resiliency due to prolonged exposure to intensive radiation. The particular mating arrangement cooperates to support each fuel element at five points of contact so as to provide proper and efficient support for the elements without substantially interfering with reactor coolant flow.

SUMMARY OF THE INVENTION

In the spacer grid arrangement of the U.S. application No. 748,149 there are a large number of independent pieces within the assembly. For example, each spring ferrule is an independent element maintained in the assembly only by the specific intermeshed structural arrangement, the two materials being incompatible for joining by welding. Under certain circumstances such as excessive vibration, it is possible that the spring ferrules could work loose from the entrapping grid structures by slicing through the spacer elements. Loose pieces within the reactor would present a serious maintenance problem in that they could block coolant flow passages or cause physical damage to other reactor structural internals.

In order to prevent possible reactor damage from loose spring ferrules, the present invention provides an improved spacer grid arrangement having means for retaining the spring ferrules within the grid assembly. A separate matrix of thin rods (either wire or thin strips) is entrapped in the assembly of the larger grid structure. The material of which the matrix is formed is compatible with the material from which the spring ferrules are made so that each ferrule can be fixed to the matrix such as by welding. The spring ferrules would thus all be interconnected and could not work loose to present a possible maintenance problem.

DESCRIPTION OF THE PREFERRED EMBODIMENT

Figure 1:
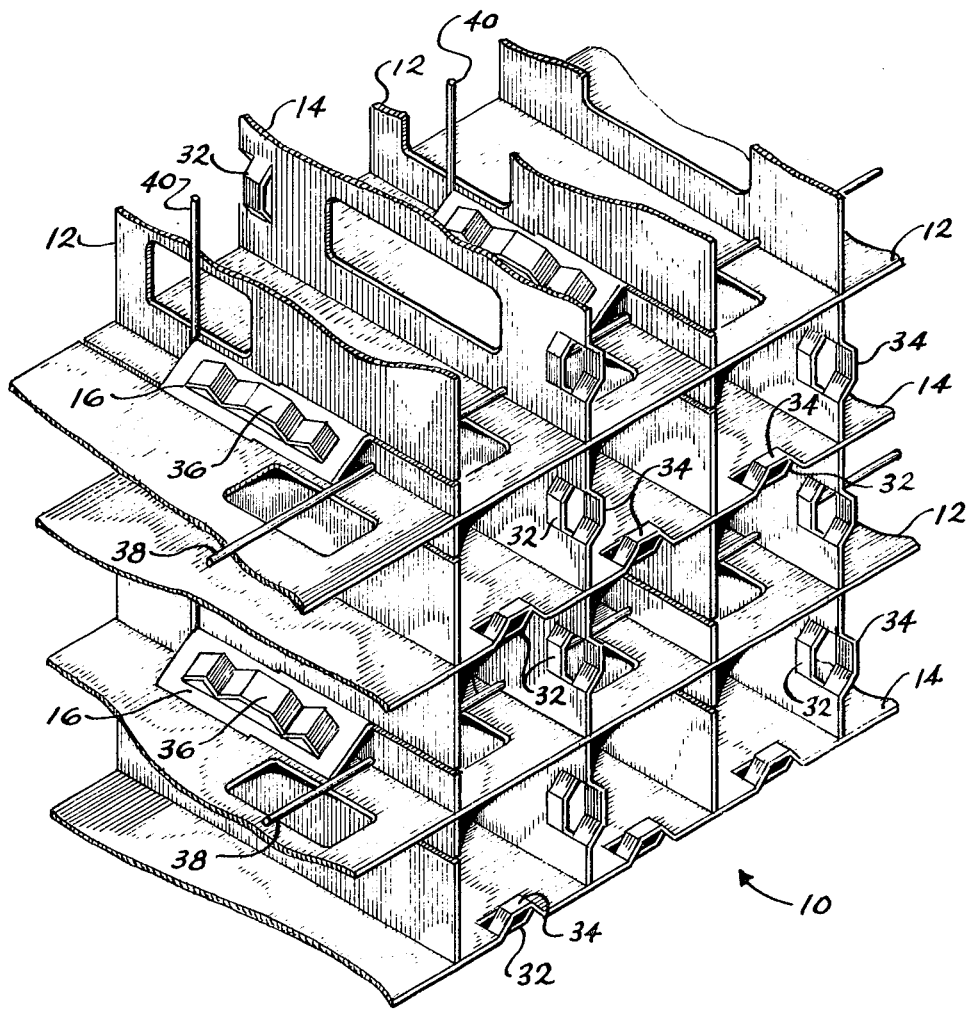
FIG. 1 is a partial isometric view of the spacer grid arrangement according to the present invention and positioned 90° from the vertical for ease of showing.
Figure 2:
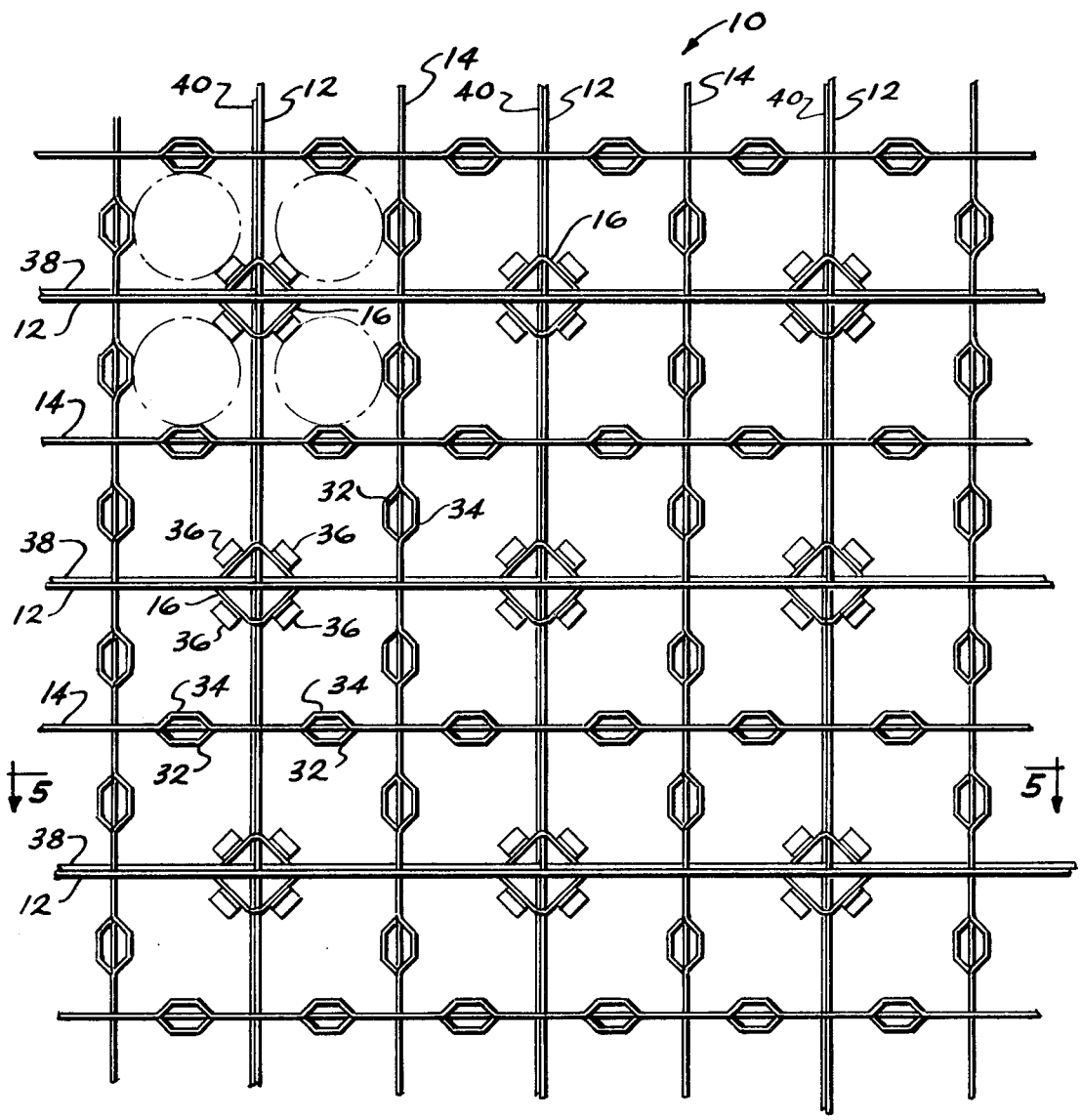
FIG. 2 is a partial plan view of the spacer grid arrangement of FIG. 1.
Figure 5:
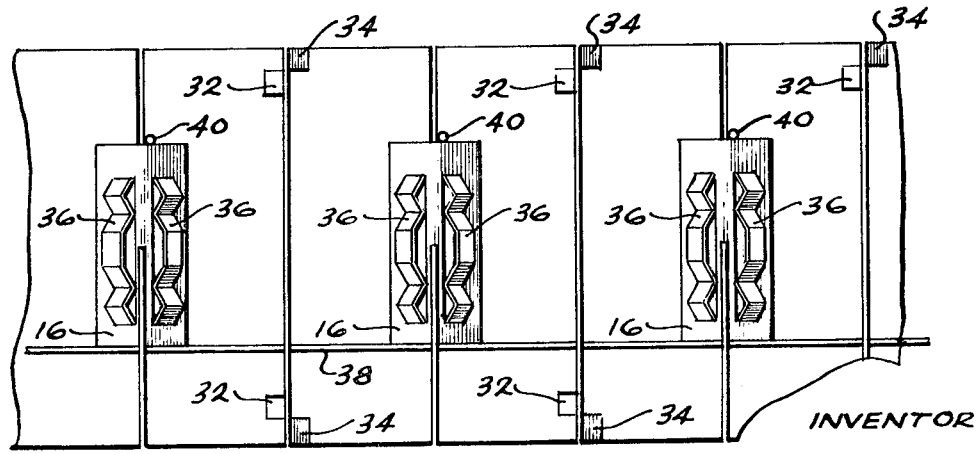
FIG. 5 is a partial sectional view of the spacer grid arrangement taken along the line 5—5 of FIG. 2.

Referring now to the drawings, FIGS. 1, 2 and 5 show the improved assembled spacer grid arrangement 10 of this invention. The basic grid structure is that which is shown and fully described in U.S. application Ser. No. 748,149. The description of this structure will be herein repeated only in such detail so as to enable a full understanding of the improvement employed by the instant invention.

Figure 3:
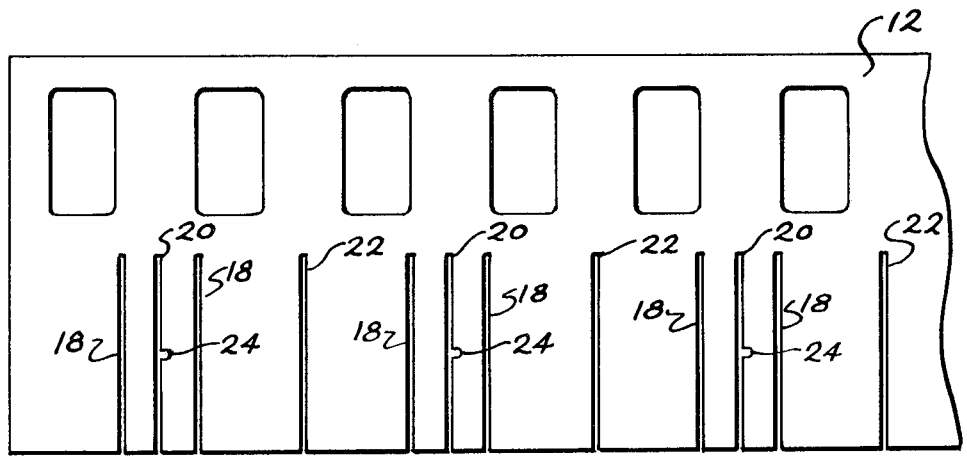
FIG. 3 is a partial side elevation of a primary spacer element for use in the spacer grid arrangement of FIGS. 1 and 2.

The basic spacer grid arrangement 10 is comprised of three main elements: primary spacer elements 12, secondary spacer elements 14, and spring ferrules 16. The primary spacer element 12 is more particularly shown in FIG. 3. This element is made from a material having a characteristic low neutron capture cross section such as Zircaloy. It is formed by stamping or otherwise machining Zircaloy sheets. The primary spacer element 12 has slots 18 which serve to entrap the spring ferrules 16 upon assembly of the grid structure. There is also provided slots 20 and 22 to accommodate transverse primary spacer elements 12 and secondary spacer elements 14 respectively when the grid members are assembled. The slots 20 have provided at the midpoint of their length notches 24 for the purpose to be explained hereinbelow.

Figure 4:
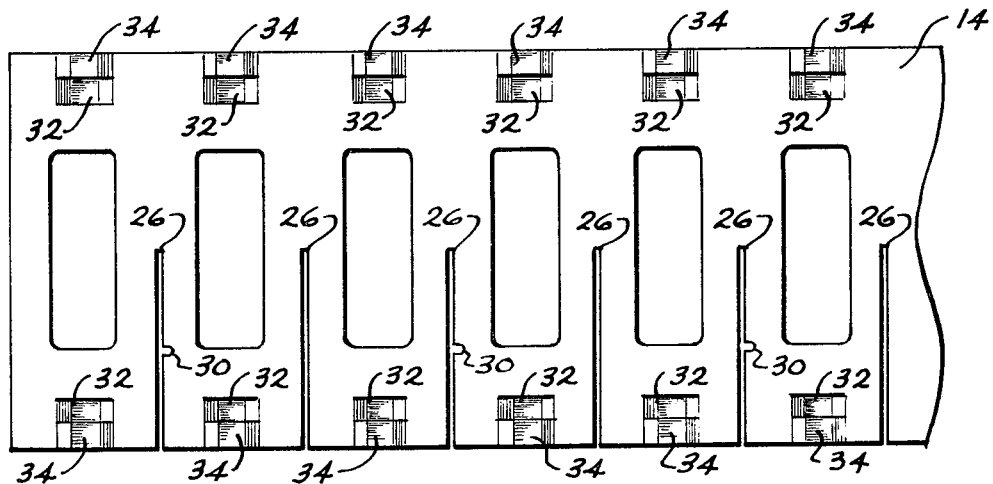
FIG. 4 is a partial side elevation of a secondary spacer element for use in the spacer grid arrangement of FIGS. 1 and 2.

The secondary spacer element 14 shown in FIG. 4 is also formed from a material having a characteristic low neutron capture cross section such as Zircaloy. Again, this element is formed by stamping or otherwise machining sheets of Zircaloy. This secondary spacer element has slots 26 and 28 to accommodate transverse primary spacer elements 12 and secondary spacer elements 14, respectively, upon grid assembly. Slots 26 have provided at the midpoint of their length notches 30 for the purpose to be explained hereinbelow. There is additionally provided in the secondary spacer element 14, arches 32 and 34 which serve as point contacts for the fuel elements when the spacer grid arrangement 10 is fully assembled and loaded (see FIG. 2).

The primary spacer elements 12 and secondary spacer elements 14 are intermeshed by the interlocking of respective slots as best seen in FIG. 5. Spring ferrules 16 are entrapped within the slots 18 of the primary spacer elements 12 upon the assembly thereof. The spring ferrules 16 are formed from a material having better stress relaxation properties than the material from which the spacer elements are formed, as for example Inconel. By the use of this bimetallic arrangement, the advantages of each material may be taken into account; i.e., the low neutron capture cross section characteristic of the Zircaloy will make up the majority of the spacer grid arrangement 10 while the actual spring force on the fuel elements will be accomplished by the Inconel spring ferrules 16 which have better stress relaxation properties upon prolonged exposure to intensive radiation but do not exhibit a preferred neutron capture cross section. The intermeshing relationship, however, is necessary for entrapping the ferrules 16 since the material from which they are formed and the material of the spacer elements are not compatible for welding.

The spring ferrules 16 have spring portions 36 which serve to resiliently force the fuel elements against opposing arches 32 and 34 (as particularly shown in FIG. 2). In this manner each fuel element is supported by a five-point contact to provide proper and efficient support thereof while permitting substantially unrestricted coolant flow through the grid arrangement 10 and about the fuel elements.

It is the purpose of this invention to interconnect each of the spring ferrules 16 in a separate matrix so as to prevent the possibility of any particular ferrule from working loose from the entrapping structure under vibrational forces to cause possible internal reactor damage. To accomplish this purpose, thin rods 38 and 40 are provided to interconnect each of the spring ferrules 16. Thin rods 38 and 40 may be either wire or thin strips and are formed from a material compatible with the material from which the spring ferrules 16 are formed in order that the rods may be joined to the ferrules such as by welding. Preferably, if the spring ferrules 16 are of Inconel, the thin rods 38 and 40 are also of Inconel.

Upon assembly of the spacer grid arrangement 10, spring ferrules 16 are located at selected intersections of primary spacer elements 12 so that the ferrules are oriented in rows with respect to one another. Each spring ferrule 16 in a particular row is interconnected to each other ferrule in that row at one end by means of, for example, welding to the thin rods 38. Each other end of the ferrules is connected by, for example, welding to transverse thin rods 40, as can be seen in FIG. 1, which connect to spring ferrules in transversely adjacent rows. Thin rods 38 and 40 are entrapped in respective notches 24 and 30 upon assembly of the spacer elements 12 and 14 to retain the separate matrix within the assembled grid arrangement 10.

Thus it can be seen that a spacer grid arrangement is provided which has all of the advantages of the aforementioned bimetallic spacer grid of U.S. application Ser. No. 748,149 and additionally interconnects all spring ferrules so as to prevent the possibility of any particular ferrule working loose from the spacer grid arrangement into the reactor to cause potential damage thereto. A separate matrix interconnecting the ferrules is provided by joining together, such as by welding, the spring ferrules by thin rods transversely oriented in the grid arrangement. The separate matrix is entrapped in the grid arrangement upon assembly thereof so as to retain the ferrules therein.

I claim:
1. A fuel assembly spacer grid for a nuclear reactor comprising a plurality of intermeshed spacer elements in a grid arrangement for supporting a plurality of fuel elements; a plurality of spring ferrules, said spring ferrules being mounted on said spacer elements at selected intersecting points thereof so as to be oriented in rows; and retainer means comprising a plurality of interconected thin rods physically secured in turn with said plurality of spring ferrules to form a separate matrix thereof within said grid arrangement, said retainer means serving to fixedly retain said spring ferules within said spacer grid arrangement.

2. The arrangement of claim 1 wherein said spring ferrules have a first end and a second end and wherein each of said first ends of a row of spring ferrules is interconnected by a single thin rod of said retainer means and each of said second ends of said spring ferrules of said row is interconnected to spring ferrules in rows transverse to said first mentioned row by thin rods of said retainer means directed transversely to said single thin rod of said first mentioned row.

3. The arrangement of claim 2 wherein said spring ferrules are joined to respective thin rods by welding.

4. The arrangement of claim 2 wherein said spacer elements have elongated slots particularly located therealong such that upon assembly of said spacer elements and said spring ferrules a grid arrangement is formed, and selected of said elongated slots having notches therein to allow passage of said thin rods forming said separate matrix while retaining said rods against transverse movement.

5. The arrangement of claim 2 wherein said spacer elements are formed of a first material having a characteristic low neutron capture cross section, said spring ferrules are formed of a second material which has better stress relaxation properties than said first material, and said separate matrix being a third material compatible with said second material said separate matrix joined to said spring ferrules by weldings.

6. The arrangement of claim 5 wherein said first material is zircaloy and said second material is a nickel, chromium, iron alloy.

7. The arrangement of claim 5 wherein said first material is zircaloy and said second and third materials are a nickel, chromium, iron alloy.

References Cited

UNITED STATES PATENTS

| | | | |
|---|---|---|---|
| 3,298,922 | 1/1967 | Prince et al. | 176—78 |
| 3,301,765 | 1/1967 | Eyre et al. | 176—78 |
| 3,350,275 | 10/1967 | Venier et al. | 176—78 |
| 3,352,003 | 11/1967 | Murtha | 176—78 X |
| 3,369,973 | 2/1968 | Voigt et al. | 176—78 |
| 3,379,619 | 4/1968 | Andrews et al. | 176—78 |
| 3,380,890 | 4/1968 | Glandin et al. | 176—78 |
| 3,398,053 | 8/1968 | Huber et al. | 176—78 |
| 3,442,763 | 5/1969 | Chetter et al. | 176—78 |

BENJAMIN R. PADGETT, Primary Examiner

G. G. SOLYST, Assistant Examiner

U.S. Cl. X.R.

176—76